(12) United States Patent
Chliwnyj et al.

(10) Patent No.: US 6,661,596 B2
(45) Date of Patent: Dec. 9, 2003

(54) APPARATUS AND METHOD FOR ADAPTING A DATA RECORDING DEVICE TO AMBIENT ENVIRONMENTAL CONDITIONS SUCH AS TEMPERATURE AND HUMIDITY IN ORDER TO REDUCE THE RISK OF DAMAGE TO THE STORAGE MEDIA

(75) Inventors: Alex Chliwnyj, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 09/846,859

(22) Filed: May 1, 2001

(65) Prior Publication Data

US 2002/0163751 A1 Nov. 7, 2002

(51) Int. Cl.$^7$ ................................................ G11B 15/48
(52) U.S. Cl. ........................................................ 360/74.3
(58) Field of Search .............................. 360/71, 73.01, 360/73.04, 74.3

(56) References Cited

U.S. PATENT DOCUMENTS

| | | | |
|---|---|---|---|
| 4,015,799 A | 4/1977 | Koski et al. | |
| 4,125,881 A | 11/1978 | Eige et al. | |
| 5,313,343 A | 5/1994 | Yatomi | |
| 5,327,304 A | 7/1994 | Owada et al. | |
| 5,576,905 A | 11/1996 | Garcia et al. | |

FOREIGN PATENT DOCUMENTS

| | | | |
|---|---|---|---|
| JP | 2-083841 | * | 3/1990 |
| JP | 2083841 | | 3/1990 |
| JP | 05-314576 | | 11/1993 |
| JP | 8-180519 | * | 7/1996 |

OTHER PUBLICATIONS

"Signal Amplitude Tape–Tension Control,", J. Appetta, S. T. Clegg, K. L. Smith, and D. J. Winarksi, IBM Technical Disclosure Bulletin, vol. 25, No. 8, Jan. 1983.
"Tachless Reel Assessment Test For Tape Drive," IBM Technical Disclosure Bulletin, K. D. Danielson, I.E. Henderson and D. J. Winarski, vol. 26, No. 6, Nov. 1983.
"Variable–Gain Servo Network," O. R. Buhler, J. T. Cutter, J. P. Mantey and D.R. Wood, vol. 15, No. 11, Apr. 1973, IBM Technical Disclosure Bulletin.

* cited by examiner

Primary Examiner—David Hudspeth
Assistant Examiner—Mitchell Slavitt
(74) Attorney, Agent, or Firm—Robert M. Sullivan; Bracewell & Patterson, L.L.P.

(57) ABSTRACT

A data tape drive senses the ambient temperature and the relative humidity of the environment in which the tape drive is operating. The tension exerted on the data tape by the tape drive is then adjusted as a function of the temperature and/or humidity. When the tape is more rigid at low temperature/humidity, the tension is increased. At nominal temperature/humidity, a nominal tape tension is used. However, under elevated conditions a lower tension is utilized to avoid damaging the tape. The sensors also may be used to completely prohibit drive and tape operation when the tape drive is in an extreme environment that is beyond an acceptable design range. Tape acceleration profiles due to atmospheric conditions are changed based on the propensity of the tape to stick to the head.

15 Claims, 4 Drawing Sheets

APPARATUS AND METHOD FOR ADAPTING A DATA RECORDING DEVICE TO AMBIENT ENVIRONMENTAL CONDITIONS SUCH AS TEMPERATURE AND HUMIDITY IN ORDER TO REDUCE THE RISK OF DAMAGE TO THE STORAGE MEDIA

BACKGROUND OF THE INVENTION

1. Technical Field

The present invention relates in general to an improved means for enhancing the performance of a data recording device, and in particular to an improved means for adapting a data recording device to changes in environmental conditions. Still more particularly, the present invention relates to an improved apparatus and method for adapting a data tape drive to changes in ambient temperature and humidity.

2. Description of the Related Art

Data recording devices, such as data tape drives, record information to or read information from a data storage device, such as the data tape of a tape cartridge. As data tapes have become increasingly thinner, they have become more susceptible to damage during operation at elevated temperatures and relative humidity levels. Although the tapes and tape drives are typically designed to operate in such conditions, a majority of users never operate their equipment in extreme environments. However, testing has repeatedly shown that the mechanical properties of thin tapes change dramatically (in terms of tape handling) at elevated temperature and humidity.

For example, the tension used to reliably manipulate tape at relatively cool temperatures can damage the same tape if the ambient temperature and/or relative humidity of the environment surrounding the tape drive increases. Because of the extremely thin dimensions of modern data tapes, mechanical-only solutions that alter the mechanical properties of the materials can no longer compensate for the entire range of operational environments. Thus, an improved apparatus and method for adapting a data recording device to changes in environmental conditions in order to reduce the risk of damage to the storage media is needed.

SUMMARY OF THE INVENTION

One embodiment of a media or data tape drive uses the spare inputs on the analog to digital converter to sense the ambient temperature and the relative humidity of the environment in which the tape drive is operating. The tension exerted on the data tape by the tape drive is then adjusted as a function of the temperature and/or humidity. When the tape is more rigid at low temperature/humidity, the tension may be increased to provide a good read/write interface to the head. At nominal temperature/humidity, a nominal tape tension is used. However, at elevated temperature/humidity, a lower tension is utilized to avoid damaging the tape. The sensors also may be used to completely prohibit drive and tape operation when the tape drive is in an extreme environmental condition that is beyond an acceptable design range. The tape acceleration/deceleration profiles are altered due to changes in atmospheric conditions based on the propensity of the tape to stick to the head. Thus, in hostile environments, the performance of the tape drive is lowered to reduce the risk of tape damage.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
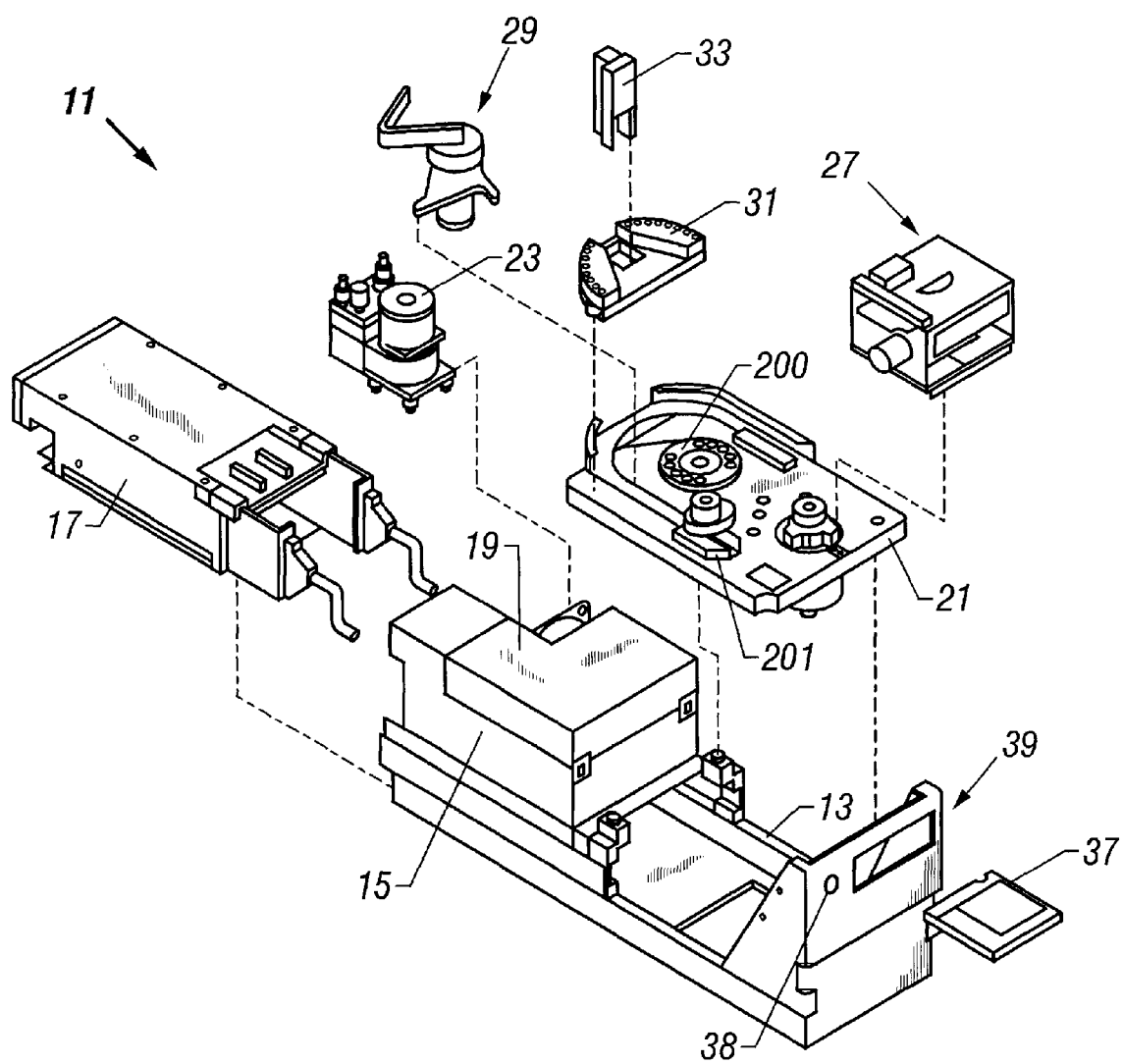
FIG. 1 is an exploded isometric view of a magnetic tape drive constructed in accordance with the invention.

Referring to FIG. 1, a magnetic tape drive 11 in which the present invention may be incorporated is shown. Although a magnetic tape drive is illustrated, one skilled in the art will recognize that air bearing sliders on the magnetic heads used in disk drives with removable media, an optical media drive, such as a CD-ROM device, a Near Field Recording device that combines magnetic and optical recording, or other devices having transducer heads for processing information with media, such as reading information from and/or writing information to media, also may employ the present invention.

Drive 11 includes a base unit 13 to which are mounted a power supply 15, various electronic circuit cards 17, 19 (such as motion control and data control), a deck assembly 21, a pneumatic assembly 23 that provides pressurized air, and tape tension transducer 201 that measures the tension in the data tape and feeds back that information to cards 17, 19. Mounted to the deck assembly 21 are a loader mechanism 27, drive motors (not shown), a pantocam assembly 29, and a head guide assembly 31. A head actuator assembly 33 is mounted to the head guide assembly 31. Drive 11 can operate in stand alone and automated tape loader environments interconnected with a host computer and also can be incorporated into a multi-drive automated data storage and retrieval system or library.

Figure 2:
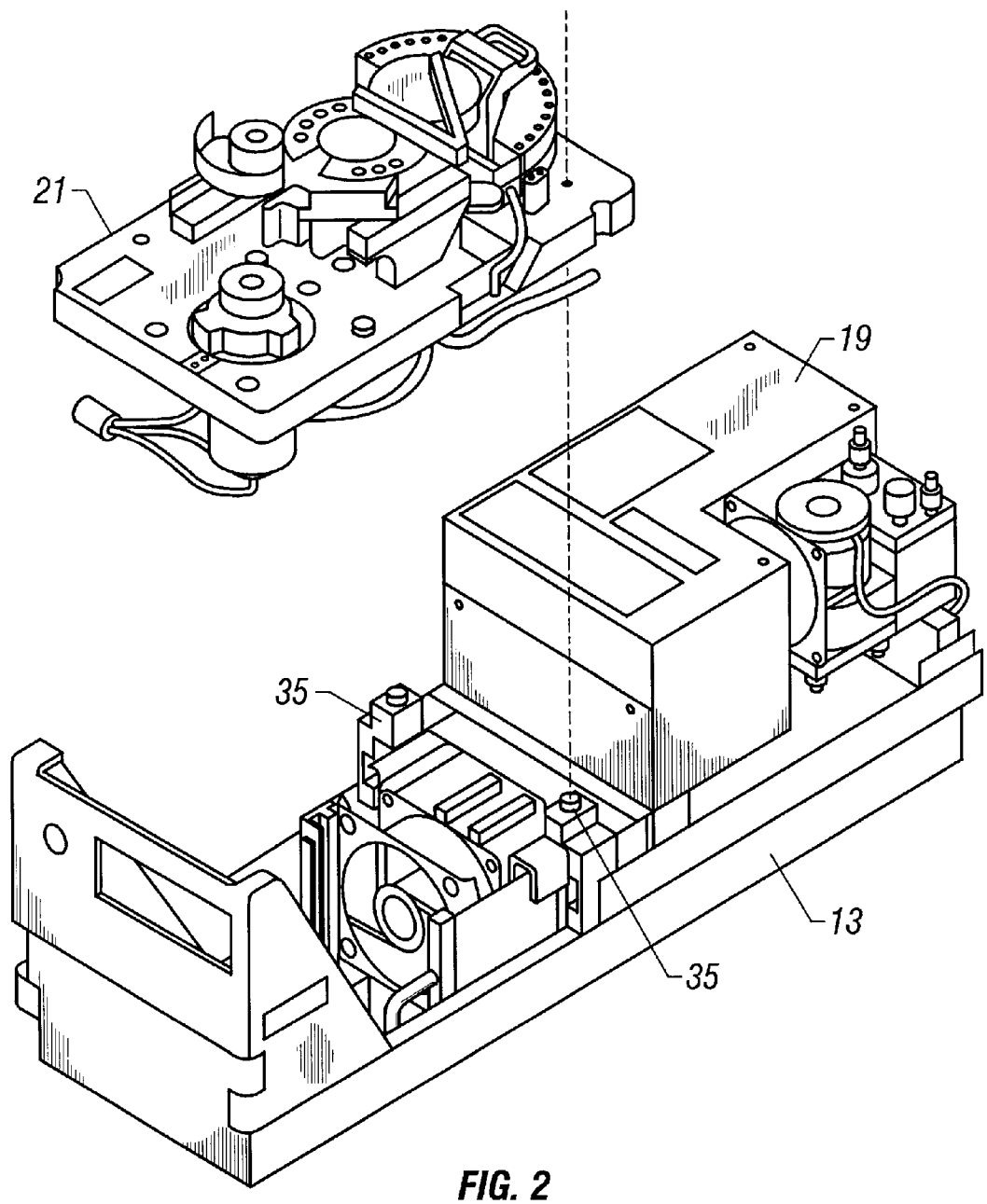
FIG. 2 is an exploded isometric view of the tape drive of FIG. 1 and a chassis having shock mounts for isolating the tape drive.

As shown in FIG. 2, shock mounts 35 are supported by the base unit 13 for isolating the deck assembly 21 from shock. Shock mounts 35 are stud-mounted-type shock mounts for assembly ease. Four shock mounts 35 (only two are shown) are positioned approximately equidistant from the center of gravity of deck assembly 21.

Figure 3:
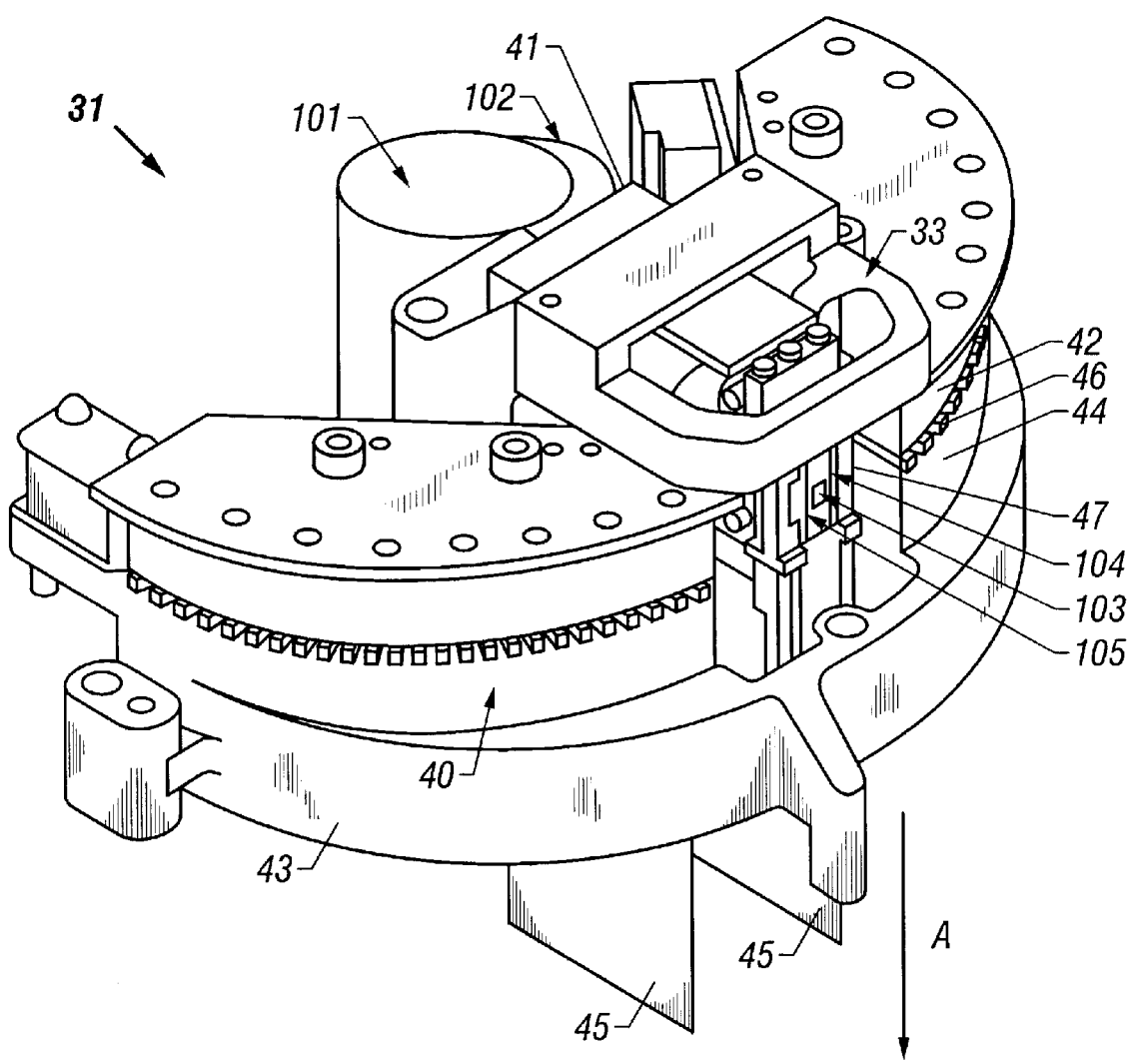
FIG. 3 is an isometric view of a head guide assembly of the tape drive of FIG. 1 having a head actuator assembly mounted therein.

Referring now to FIG. 3, actuator assembly 33 of head guide assembly 31 is secured to a base member 41. Base member 41 is coupled to a head guide support 43. Various brackets and screws secure the elements of the actuator assembly 33 together. Various cables, including ribbon cables 45 for the transducer or input/output recording head 47, interconnect the head and the coil with the circuit cards of drive 11. To reduce mechanical interference by ribbon cables 45 with proper motion of a beam member, ribbon cables 45 are preferably guided upwards along the sides of the beam member and outwardly from the base member 41 by winged surfaces inside the beam member. Head 47 may comprise a device that is read only, write-once, or one that can perform both read and write functions.

An arcuate tape guide 40 is located immediately adjacent to each side of head 47 for precisely conveying data tape toward and away from head 47. In the embodiment shown, an alumina ceramic, flat plate-like tape guide 40 is supported from above by D-bearings 42 and from below by lower support members 44 that are spaced apart from each other to provide a slot for tape guide 40. Tape guide 40 has a row of teeth 46 that define the arcuate guide path for the data tape, locating pin slots or holes (not shown), mounting bolt holes, and an air vent for hydrostatic air delivered to the head guide assembly 31. A more detailed disclosure of drive 11 is shown and described in U.S. Pat. Nos. 5,508,865, and 5,377,052, which are incorporated herein by reference.

During operation of drive 11, a removable tape cartridge 37 (FIG. 1) having a supply reel wound with magnetic tape is inserted through a slot 39 in a front face of base unit 13, and into loader assembly 27. A warning indicator 38 is located adjacent to slot 39 and will be described in further detail below. Loader assembly 27 draws the tape cartridge 37 in and lowers it onto the deck assembly 21. The pantocam assembly 29 engages the tape leader block attached to a free end of the magnetic tape and pulls the magnetic tape around the head guide assembly 31 such that the magnetic tape winds through the tape path defined by tape guide 40, and across the magnetic tape head 47 mounted to the head actuator assembly 33. The leader block is then engaged by a take-up reel 200 on the deck assembly 21 and drive 11 is then ready to record information to or read information from the magnetic tape. While drive 11 includes a take-up reel and accepts tape cartridges containing only the supply reel, the present invention is not limited to use with such a drive or cartridge combination, but also could be incorporated in other drive or cartridge combinations, such as those in which the tape cartridge contains both supply and take-up reels. A two-reel tape cartridge is also called a dual-reel cassette.

Referring again to FIG. 3, a solenoid 101 controls the flow of pressurized air through a hose 102 to head 47. Head 47 has an orifice 103 that is typically located between or to the sides of columns of I/O elements 104, 105. The data tape normally flies over I/O elements 104, 105 via, for example, a hydrodynamic air film or rollers. A hydrodynamic air film is preferred for a good head, because hydrodynamic air films are very thin. A thin hydrodynamic air film allows the data tape to fly very close to I/O elements 104, 105, which allows the transfer of data between the tape and the I/O elements of head 47. The thickness of a hydrodynamic air film is a few microinches.

The tape also flies over D-bearings 42 via a very thick hydrostatic air film. Hydrostatic air films are typically orders of magnitude thicker than hydrodynamic air films (in the range of the thickness of the tape), which is a few thousandths of an inch rather than mere microinches. Since the tape should not physically contact D-bearings 42, and since D-bearings 42 only facilitate the guiding of the tape over head 47, a thick layer of hydrostatic air between the tape and D-bearings 42 is desirable.

Figure 4:
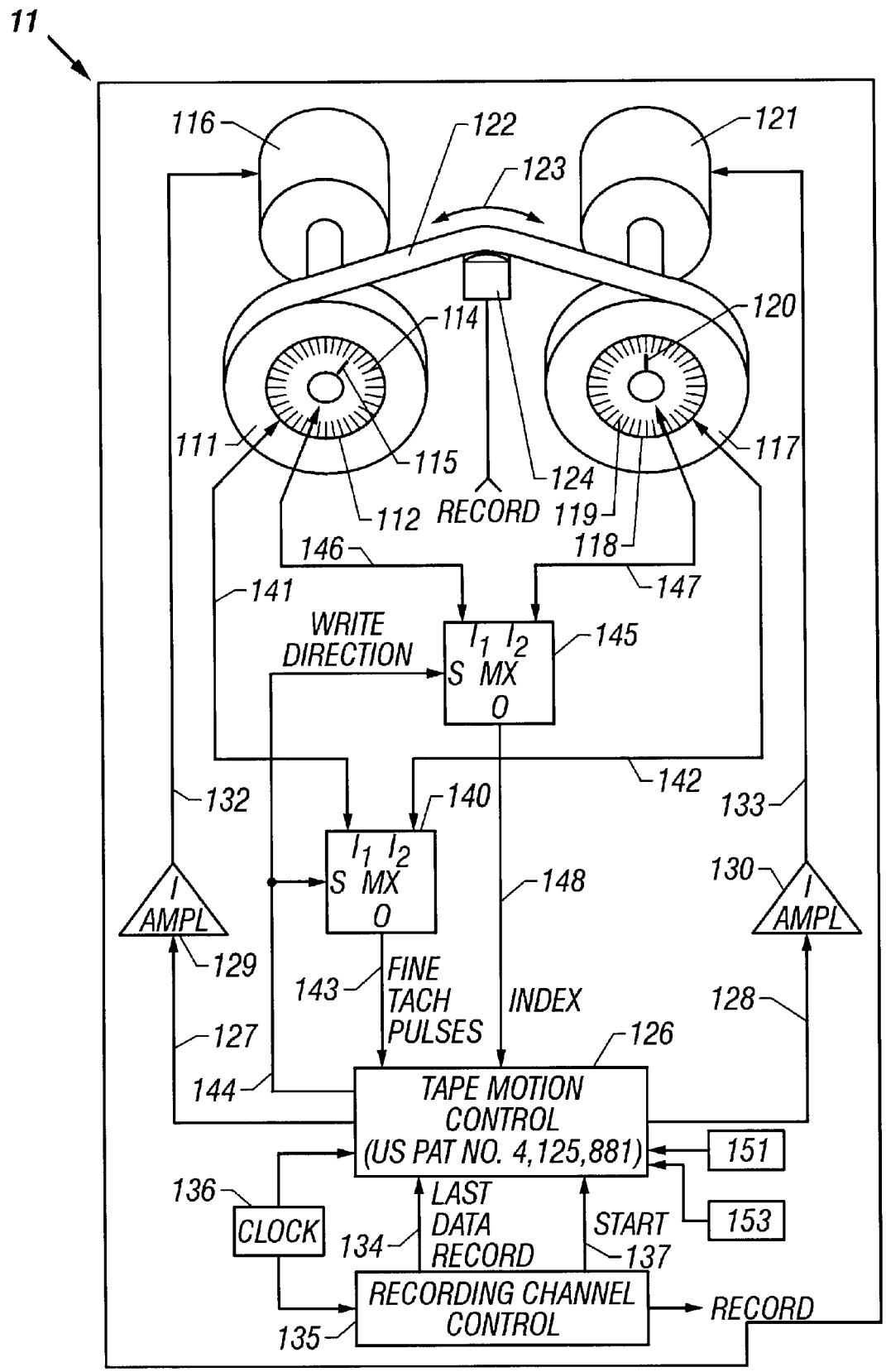
FIG. 4 is a logical schematic diagram showing the tape drive of FIG. 1.

Referring now to the schematic diagram of FIG. 4, the preferred version of tape drive 11 includes a pair of reels 111, 117, each driven by a bi-directional motor 116, 121, respectively. Mounted to the drive shaft of each of the motors 116 and 121, is a fine-line tachometer 112, 118, with an outer circular array of fine tachometer lines 114, 119, and an index line 115, 120 displayed radially inward on a respective coding wheel from the fine-line array. A tape 122 is wound to the reels 111, 117 and the motors 116, 121 are controlled to move the tape 122 for recording and playback in either of the two directions indicated by the arrow 123.

Each of the tachometers 112, 118, functions as a tape motion sensor; each emits a single pulse in response to an index mark to signify completion of a relatively large preselected angle, preferably 360°, that is, once per revolution of the reels 111, 117. In addition, each of the tachometers 112, 118 generates a two-phase fine tachometer signal comprising two phase-displaced pulse streams. The fine-line tachometer arrays on the tachometers 112, 118 are identical, each emitting N pulses during each revolution of respective reels 111, 117.

Assume that the tape 122 is being advanced from the reel 111 to the reel 117 for recording data through a magnetic write/read record head 124 positioned between the reels 111 and 117 in engagement with a recording surface of the tape 122. Relatedly, the reel 111 is the "supply" reel while the reel 117 is the "take-up" reel. Also assume that a complete longitudinal track of data has been written on the tape 122 while the tape is being fed from the reel 111 to the reel 117. In order to continue recording without rewinding the tape, the direction of the tape motion is reversed while recording continues, that is data is written while the tape is advanced from the reel 117 (which now becomes the supply reel) to the reel 111 (now the take-up reel). Another complete longitudinal track of data, parallel to the first data track is written on the tape, and the tape motion is once again reversed, and so on.

During advancement of the tape 122, various parameters, such as a tape motion, position, tension, are monitored in order to derive motor currents having the polarity and magnitude necessary to operate the motors 116, 121 while recording data on the tape 122. These currents are derived by the algorithm of U.S. Pat. No. 4,125,881 (incorporated herein as the '881 patent) in response to fine tachometer line and tachometer index signals which are fed to a tape motion control unit 126. The tape motion control unit 126 processes the fine tachometer and index pulses, generating currents for the motors 116 and 121 on respective current lines 127 and 128. The signals on the current lines 127 and 128 are amplified at 129 and 130, respectively, and amplified motor currents are conducted to the motors 116, 121 on the outputs 132, 133.

Under normal operating conditions, the tape motion control unit 126 operates to maintain the motors 116 and 121 at constant nominal velocities for recording, reading, and searching. In addition, unit 126 controls the motors 116 and 121 to perform the back hitch operation described above in response to a signal indicating the last data record on signal line 134, which is provided by a recording channel control unit 135. Recording channel control unit 135 provides a record signal for driving the magnetic write/read head 124 and also generates signals for synchronizing recording operations with tape motion, one of the signals indicating the writing of a last data record. A clock unit 136 provides clock pulses to the tape motion control unit 126 and the recording channel control unit 135 for synchronization of their operations.

During a back hitch operation, when the recording is interrupted, the motion of the tape 122 must be stopped to await the next record operation. When signal line 134 is activated, indicating that the last data record has been written, the control unit 126 operates the motors 116 and 121 to decelerate and stop the motion of the tape 122 and to move the tape in the reverse direction to a pont where the tape is stopped to await the next record operation.

As described in the '881 patent, clock pulses are counted from the beginning of the IBG until the first fine-line tachometer pulse occurs in the IBG, which produces a timing reference between the end of the last data record and the fine-line tachometer pulse occurring in the IBG. This timing reference is employed to determine the end of the IBG by subtracting from the nominal IBG transit time. The result is the time from the fine-line tachometer pulse in the IBG to the end of the IBG, and it is used to generate the end of IBG signal 148, which resynchronizes the recording channel unit, 135, to the data previously recorded on tape. The tachometer pulse occurring in the IBG is referred to as the "position reference pulse" and it initiates counting of fine-line pulses during the repositioning of tape until tape has been stopped to await the next data record.

When the next data record is ready for recording, tape motion is started by provision of the start signal on 137 by the control unit 135. In response to the start signal, the control unit 126 provides motor drive currents to accelerate the tape 122 from its stopped position back through the IBG. When the end of the IBG is traversed, the control unit 126 provides a resynchronization signal to the control unit 135, which causes recording to start. The control unit 126 determines the location of the IBG during tape acceleration by counting down a fine-line tachometer pulse count which was accumulated from the location of the position reference pulse to the point where the tape was stopped and then timing by clock pulse count from the occurrence of the position reference pulse to the end of the IBG.

The relationship between fine-line tachometer pulse generation and tape position must be unchanging during the back hitch operation. Otherwise, the fine-line pulse countdown and clock pulse timeout to the end of the IBG will be incorrect. The relationship between tape position and tachometer fine-line pulse count is changed when entrained air bleeds out from between the outermost layers of the tape on the take-up reel. In this regard, the take-up reel is that reel to which tape is advanced during a write operation, the designation remaining unchanged even during the back hitch operation. The invention is based upon the realization that the fine-line tachometer pulses can be obtained from the supply reel in a bi-directional reel-to-reel operation by multiplexing between the fine-line tachometer outputs in response to a signal indicating the direction in which the tape has advanced for recording. This is hereinafter referred to as the "write direction." This signal is produced by the tape motion control unit 126 and provided to the multiplexer 140. The multiplexer 140 receives the fine-line tachometer outputs from the tachometers 112, 118 on signal lines 141, 142, and selects a fine-line tachometer pulse stream in response to a write direction signal produced by the tape motion control unit 126 on the signal line 144. The multiplexer 140 provides the control unit 126 the fine-line tachometer signal produced by the tachometer on the supply reel as indicated by the write direction signal.

Each of the tachometers 112 and 118 is constructed and operated to provide both a fine-line and an index pulse output during revolution of the reels 111 and 117. For the aspect of the invention illustrated in FIG. 4, the provision of an index pulse on a tachometer is a convenience which eliminates the requirement to derive an index pulse for gating fine-line tachometer pulses by means of a second tachometer assembly for each of the reels 111 and 117. Accordingly, the tape motion control apparatus in the tape drive of FIG. 4 accommodates this convenience by a second multiplexer 145 which receives the index pulse outputs of the tachometers 112 and 118 on signal lines 146 and 147. The control mechanization of the multiplexer 145 is complementary to that of the multiplexer 140 in that the index pulse output is selected from the take-up reel as indicated by the write direction signal. A fine-line tachometer pulse stream and an index pulse sequence are provided on signal lines 143 and 148 to the tape motion control unit 126, which employs them to operate the motors 116 and 121 as described in the incorporated '881 patent.

Again referring to FIG. 4, drive 11 is also provided with means for sensing and measuring the ambient environmental conditions, such as temperature and relative humidity, in order to handle tape 122 in a different manner. In the embodiment shown, temperature sensing means 151 and humidity sensing means 153 are utilized to detect the surrounding temperature and relative humidity, respectively, of drive 11 and provide such information to tape motion control 126. For example, means 151, 153 may comprise solid state temperature and humidity sensors, respectively. In one type of tape drive, spare inputs on the analog to digital converter are used to input the information from means 151, 153.

As the ambient temperature and/or humidity rise, the media tape becomes weaker and less rigid. The strength of media tape is especially sensitive to elevated temperatures. As a result of sensing the increase in the environmental conditions, the tape is not handled in a manner that is suitable for a normal range of operating temperature and relative humidity. This is particularly true during the starting and stopping sequences of the tape, which subject the tape to its maximum operational stress. Thus, the acceleration and/or deceleration of the tape is limited by tape motion control 126 during start/stop operations to avoid damage to the weakened tape. Ideally, tension on the tape is a function of temperature and humidity. When the tape is more rigid at lower temperature and/or humidity, the tension is increased to provide a good read/write interface to the head. At nominal temperature and/or humidity, a nominal tape tension is provided. At elevated temperature and/or humidity, a lower tape tension is provided to avoid damaging the tape.

Altering the handling of the tape in response to elevated temperature and/or humidity may change the overall performance of drive 11. Moreover, if the temperature and/or humidity rises to such extreme levels that any operations risk damage to the tape (i.e., the temperature and/or humidity exceeds an acceptable level, such as during an air conditioning failure), drive 11 may temporarily cease operations and/or refuse to load the tape until the risk of damage to the tape subsides.

The present invention has several advantages. The tape drive is provided with means for adjusting the tension exerted on the data tape as a function of the temperature and/or humidity in which the tape drive is operating. Alternatively, the tape drive may be temporarily disabled when the tape drive is in extreme environmental conditions. Thus, in more hostile environments, the performance of the tape drive is lowered to reduce the risk of damage to the media.

While the invention has been shown or described in only some of its forms, it should be apparent to those skilled in the art that it is not so limited, but is susceptible to various changes without departing from the scope of the invention. For example, the present invention also applies to optical tape.

What is claimed is:

1. A device for interacting with a media, comprising:
   a head guide assembly having a transducer head for processing information with the media;
   drive means for moving the media relative to the transducer head; and
   detection means for detecting ambient operating conditions, wherein the drive means adjusts the handling of the media in response thereto; and wherein the detection means detects ambient relative humidity.

2. The device of claim 1 wherein the detection means detects ambient temperature.

3. The device of claim 1 wherein acceleration and deceleration of the drive means is inversely proportional to the ambient operating conditions.

4. The device of claim 1 wherein the detection means utilizes a solid state sensor.

5. The device of claim 1 wherein further processing of information with the media ceases when the ambient operating conditions exceed a defined threshold.

6. A tape drive for reading information from and/or writing information to a data tape of a tape cartridge, the tape drive comprising:
   a transducer head for processing information with the data tape;
   drive means for moving the data tape of the tape cartridge relative to the transducer head;
   a tape guide located adjacent to the transducer head for guiding the data tape relative to the transducer bead;
   temperature sensing means for detecting changes in an ambient operating temperature, wherein the drive means reduces an acceleration and deceleration of the data tape in response to an increase in the ambient operating temperature; and wherein acceleration and deceleration of the drive means is inversely proportional to the ambient operating conditions.

7. The tape drive of claim 6, further comprising humidity sensing means for detecting changes in an ambient operating relative humidity.

8. The tape drive of claim 6 wherein the temperature sensing means utilizes a solid state sensor.

9. The tape drive claim 6 wherein further processing of information with the data tape ceases when the ambient operating temperature exceeds a defined threshold.

10. A method of altering operation of a head guide assembly, comprising the steps of:
    (a) providing a device for interacting with a media, the device having a transducer head for processing information with the media, and a detector for detecting ambient operating conditions;
    (b) moving the media relative to the transducer head to process information;
    (c) detecting a change in the ambient operating conditions with the detector; and then
    (d) altering movement of the media in response to the change in the ambient operating conditions by inversely acceleration and deceleration of the media to the ambient operating conditions.

11. The method of claim 10 wherein step (c) comprises sensing a change in ambient temperature.

12. The method of claim 10 wherein step (c) comprises sensing a change in relative humidity.

13. The method of claim 10 wherein step (c) comprises sensing a change in ambient temperature and relative humidity.

14. The method of claim 10 wherein step (d) comprises ceasing processing of information with the media when the ambient operating conditions exceed a defined threshold.

15. The method of claim 10, wherein comprising the step of refusing to load the media in the device when the ambient operating conditions exceed a defined threshold.

* * * * *

UNITED STATES PATENT AND TRADEMARK OFFICE
CERTIFICATE OF CORRECTION

PATENT NO. : 6,661,596 B2
DATED : December 9, 2003
INVENTOR(S) : Chliwnyj et al.

It is certified that error appears in the above-identified patent and that said Letters Patent is hereby corrected as shown below:

<u>Column 8,</u>
Line 29, please insert the word -- ambient -- between the words "in" and "relative".
Line 36, please remove the word "wherein" and insert the word -- further --.

Signed and Sealed this

Ninth Day of March, 2004

JON W. DUDAS
*Acting Director of the United States Patent and Trademark Office*